Sept. 26, 1961 W. H. SIMMONS 3,001,743
DISENGAGE SYSTEM FOR AIRCRAFT TAIL HOOK
Filed April 20, 1960 2 Sheets-Sheet 1

INVENTOR.
WILLIAM H. SIMMONS
ATTORNEYS

Sept. 26, 1961 W. H. SIMMONS 3,001,743
DISENGAGE SYSTEM FOR AIRCRAFT TAIL HOOK
Filed April 20, 1960 2 Sheets-Sheet 2

INVENTOR.
WILLIAM H. SIMMONS
BY S. J. Rotondi,
a. J. Dupont & S. Parloff
ATTORNEYS:

… … …

3,001,743
DISENGAGE SYSTEM FOR AIRCRAFT TAIL HOOK
William H. Simmons, 1107 Roberts Ave., Feasterville, Pa.
Filed Apr. 20, 1960, Ser. No. 23,583
1 Claim. (Cl. 244—110)
(Granted under Title 35, U.S. Code (1952), sec. 266)

The invention described herein may be manufactured and used by or for the Government for governmental purposes without the payment to me of any royalty thereon.

This invention relates to moving vehicle arresting gear of the type wherein the motion of the vehicle is stopped by the engagement between a fixed cable and a hook attached to the vehicle. Its principal object is to provide an improved gear whereby detachment of the hook from the arresting cable is effected either automatically or manually from any desired point such as the cockpit of an aircraft.

The gear presently used to arrest moving aircraft includes a hook attached to the aircraft and adapted to engage a fixed cable which is stretched across the path of the moving aircraft. In the use of this gear, it is customary to manually detach the hook from the arresting cable. This requires the presence of an attendant under the aircraft, results in delay, and involves the danger of injury to the attendant, especially in the case of jet propelled aircraft. The present invention avoids these difficulties by the provision of an improved gear which is controllable from a safe location, or one which is automatically operated to disengage the hook after the forward velocity of the vehicle has been reduced to a predetermined value.

The invention will be better understood from the following description when considered in connection with the accompanying drawings and its scope is indicated by the appended claim.

Figure 1:
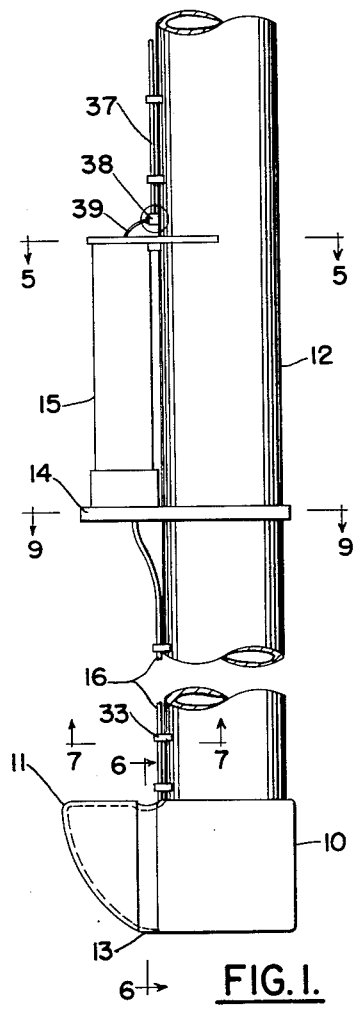
Figure 3:
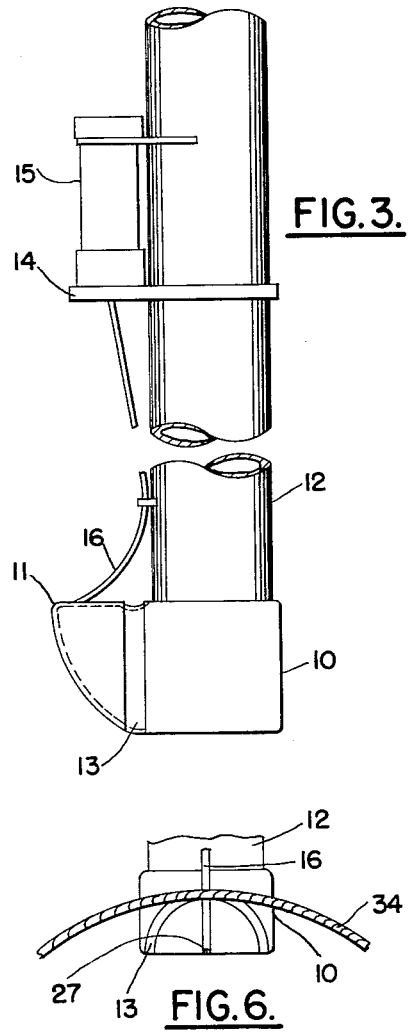
Figure 6:
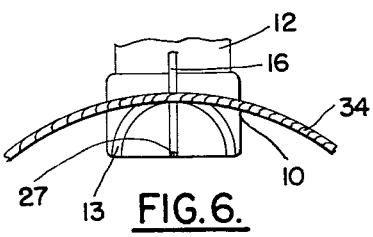
Figure 7:
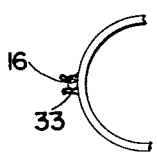
Figure 8:
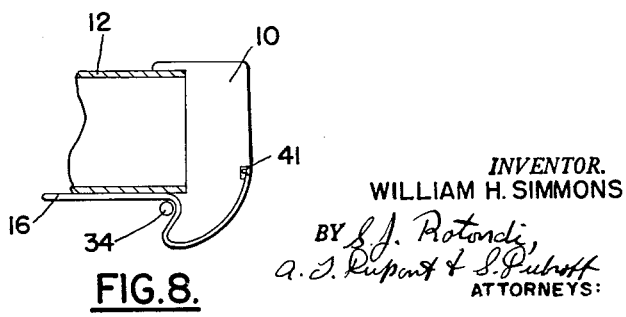
Figure 4:
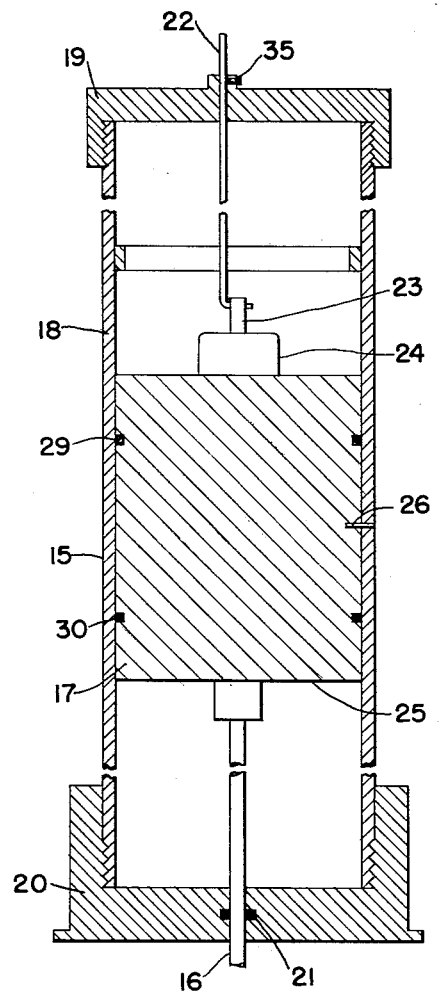
Figure 2:
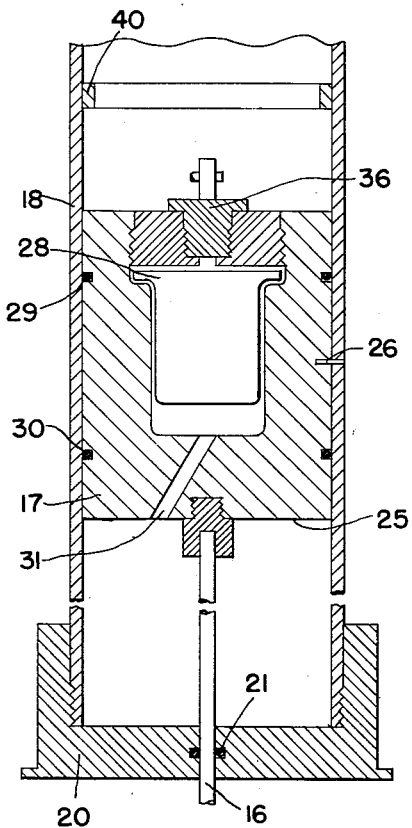
Figure 9:
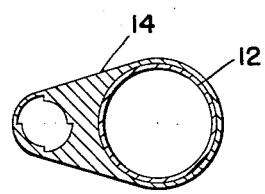

Referring to the drawings:
FIG. 1 is an exterior view of one form of the invention embodying the principle of remote actuation of the disengage operation by electrical means,
FIG. 2 shows certain details of an actuator which is part of the gear illustrated by FIG. 1,
FIG. 3 shows a modified form of the invention embodying the principle of automatic actuation,
FIG. 4 shows an actuator which is part of the gear illustrated by FIG. 3,
FIG. 5 shows a section taken on the line 5—5 of FIG. 1,
FIG. 6 shows a section taken on the line 6—6 of FIG. 1,
FIG. 7 shows a section taken on the line 7—7 of Fig. 1,
FIG. 8 shows a section taken at right angles to the section 6—6 of FIG. 6, and
FIG. 9 shows a section taken on the line 9—9 of FIG. 1.

The gear of FIG. 1 includes a hook 10 which is attached to an aircraft in a manner well known to those skilled in the art and has a tip 11 and a shank 12. Intermediate the tip 11 and the shank 12 may be a groove 13 which is adapted to engage a fixed arresting cable 34 (FIGS. 6 and 8).

Figure 5:
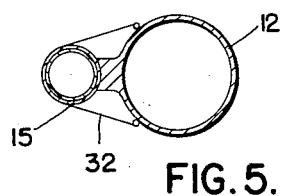

Fixed to the shank 12 is a support 14 upon which is mounted an actuator 15, the upper end of which, as indicated in FIG. 5, may be tied to the shank by a readily detachable coupling such as a metal ribbon clamp 32.

A disengaging cable 16 has one of its ends connected to the hook 10 near the tip 11 by a readily detachable coupling such as a pin or interrupted thread fitting 41 (FIG. 8) and the other of its ends connected to the movable member 17 (FIG. 2) of the actuator 15. Spring clamps 33 (FIG. 7) support the disengaging cable 16 on the shank 12. As indicated in FIG. 6, the hook 10 has a groove 27 (disposed at right angles to the groove 13) in which tthe disengaging cable lays.

As indicated in FIG. 2, the actuator 15 (of FIG. 1) includes a cylinder 18 which has an end cap 20 at its lower end. The disengaging cable 16 extends through the end cap 20, is surrounded by a seal ring 21, and is attached to the movable member 17. The movable member 17 is surrounded by seal rings 29 and 30 and is secured in its initial position by shear pin 26. An explosive cartridge 28 is mounted in the movable member 17 and an electric ignition element 36 is provided to ignite the explosive charge. A passageway 31 in member 17 provides the means for transmitting the gas pressure generated by the cartridge to the pressure chamber between the surface 25 and the end cap 20. An electric firing wire 37 (FIG. 1) attached to the shank terminates in a quick disconnect fitting 38; a lead wire 39 completes the electrical linkage between the operator and the electrical ignition element 36. A constricted area 40 (FIG. 2) or upper end cap similar to 19 (FIG. 4) prevents the member 17 from separating from the actuator 15.

The actuator 15, disengaging cable 16, fitting 41, and lead wire 39 for electric systems, comprise an assembly which is readily demountable and replaceable.

With the various parts disposed as indicated in FIG. 1 and as described heretofore, the hook 10 engages the arresting cable 34 upon landing. When the forward velocity of the aircraft has been checked by the arresting engines, the pilot energizes the electrical firing circuit causing the electric ignition element 36 to fire and ignites cartridge 28. Gas pressure generated by the cartridge propellant passes through the passageway 31 and acts against surface 25 of member 17, shearing pin 26 and causing member 17 to move in the direction of the end 40. As a result of this motion the disengaging cable 16 is removed from clamps 33 and is made taut between the tip 11 and the cable hole in support 14, expelling the cable 34 from the throat of hook 10.

Obviously, the explosive actuator 15 may be replaced with a pneumatic or hydraulic actuator. Also a mechanism of this type is applicable to similar functions in other devices where the expulsion of cables or other loads from hook throats will accomplish definite uses; a diverse example of such use is in the jettisoning of loads from crane hooks.

The modification of FIGS 3 and 4 differs from that of FIGS 1 and 2 in that the electric firing system and electrically ignited cartridge are replaced by an automatic mechanical firing system and a percussion fired cartridge, respectively.

In FIG. 4, end cap 19 supplements constriction 40 and provides a means of securing rod or cable 22 in a fixed position. Extending through this end cap, rod or cable 22 may be fixed to the end cap by a set screw 35 or other means, and is connected through a link 23 to the mechancal firing mechanism of an explosive cartridge 28 enclosed in member 17. In other respects the actuator 15 of FIG. 4 is similar to that of FIG. 2. The disengaging cable in this automatic mechanism does not lay in the groove 27 but forms an arc between the shank 12 and the tip 11.

With the various parts disposed as indicated in FIG. 3 and described above, engagement of the arresting cable 34 by the hook 10 displaces disengaging cable 16 into groove 27. As a result of the length of cable 16 and the above described action the shear pin 26 is sheared and member 17 moved toward end cap 20, operating the firing mechanism 24. The firing mechanism ignites the percussion primer, which in turn actuates the cartridge 28. Gas pressure generated by the burning propellant acts in a manner similar to that in the electrical version, exerting a force on the disengaging cable 16. Because the tension in cable 16 is considerably less than that in cable 34 during the velocity reduction of the aircraft, the cable 34 is not yet expelled from the throat of hook 10; when, however, the velocity of the aircraft is checked by the arresting engines to a degree where the relative tensions in cables 16 and 34 are reversed, the disengaging cable is drawn taut and the arresting cable is expelled.

A pyrotechnic delay element may be incorporated into cartridge 28, in which case gas pressure generation is delayed until an appropriate moment after velocity reduction of the aircraft.

Obviously and alternatively, in FIGS. 3 and 4, the mechanical firing mechanism may be manually operated by a tension on rod or cable 22, providing set screw 35 is loosened to permit cable motion.

In either version the portion of cable 16 which lies in the face of hook 10 may be in the form of a rigid member without impairment of the disengage function, and the actuator may be located in the aircraft structure or other position as dictated by environmental conditions or other considerations, with the cable 16 being secured to the length of the hook shank.

In the automatic version an inherent and novel feature is that while the engagement of the arresting cable by the hook triggers the actuator, disengagement of the arresting cable is prevented by the relative tensions in the arresting and disengaging cables. When the tension in the arresting cable falls below that in the disengaging cable the latter, under the impetus, and designed tension, of the actuator, automatically expells the arresting cable from the throat of the hook.

I claim:

In a gear for arresting a moving vehicle by engagement between a fixed cable and a hook attached to said vehicle, the combination of a hook having a tip and a shank with a groove therebetween for receiving said fixed cable, an actuator supported on said shank and including gas pressure generating means, said actuator including a member movable away from said tip by said pressure, and a disengaging cable fixed at one end to said tip and at the other end to said movable member, said disengaging cable extending transversely of said groove and resting thereagainst in its standby position.

References Cited in the file of this patent

FOREIGN PATENTS

| | | |
|---|---|---|
| 533,475 | France | Dec. 10, 1921 |
| 697,402 | Great Britain | Sept. 23, 1953 |